United States Patent [19]

Bartholomew et al.

[11] Patent Number: 4,939,509
[45] Date of Patent: Jul. 3, 1990

[54] DATA CONFERENCING ARRANGEMENT FOR STATIONS HAVING KEYBOARDS AND DISPLAYS, USING A KEYBOARD BUFFER AND A SCREEN BUFFER

[75] Inventors: Randy L. Bartholomew, Broomfield; Peter L. Johnson, Westminster, both of Colo.

[73] Assignee: AT&T Company, Murray Hill, N.J.

[21] Appl. No.: 148,329

[22] Filed: Jan. 25, 1988

[51] Int. Cl.$^5$ .................. G06F 3/14; G06F 15/62; H04M 3/56; H04M 11/00

[52] U.S. Cl. .................. 340/717; 340/711; 178/2 R; 178/3 R; 370/62; 364/933.9; 364/927.2; 364/928; 364/237.2; 364/234

[58] Field of Search ........... 364/200, 900; 340/717, 340/711; 370/62, 24; 379/88, 53, 96; 178/17 C, 2 R, 3 R, 17 R

[56] References Cited

U.S. PATENT DOCUMENTS

| | | | |
|---|---|---|---|
| 3,816,645 | 6/1974 | Ehrich et al. | 178/2 R |
| 4,107,457 | 8/1978 | Hajduk | 178/2 R |
| 4,356,545 | 10/1982 | West | 364/200 |
| 4,437,184 | 3/1984 | Cork et al. | 364/200 |
| 4,475,189 | 10/1984 | Herr et al. | 370/62 |
| 4,479,195 | 10/1984 | Herr et al. | 364/900 |
| 4,499,577 | 2/1985 | Baranyai et al. | 370/62 |
| 4,509,167 | 4/1985 | Bantel et al. | 370/62 |
| 4,555,781 | 11/1985 | Baldry et al. | 370/60 |
| 4,577,288 | 3/1986 | Busch | 364/900 |
| 4,651,299 | 3/1987 | Miyazaki et al. | 364/900 |
| 4,653,045 | 3/1987 | Stanley et al. | 370/62 |
| 4,688,170 | 8/1987 | Waite et al. | 340/717 |
| 4,710,917 | 12/1987 | Tompkins et al. | 370/62 |
| 4,727,478 | 2/1988 | Endfield et al. | 364/200 |
| 4,757,526 | 7/1988 | Foster et al. | 370/62 |
| 4,796,293 | 1/1989 | Blinken et al. | 370/62 |

OTHER PUBLICATIONS

"How an ISDN Terminal Could be Used", *Computing Canada*, vol. 12, No. 17 (8-21-86), pp. 11-12.

"Northern Telecom Releases Teleconferencing Program", *Information Week*, 3-31-86, p. 22.

L. Edelman, "Northern Adds Zip to DV-1", *Management Information Systems Week*, 3-24-86, pp. 30 and 51.

J. G. Marshall et al, "Training End-User Physicians Using Teleconference/Data Conference", *Database End-User*, 3-86, pp. 26-28.

"Dynamic Conference Call Participation", *IBM Technical Disclosure Bulletin*, vol. 28, No. 3, 8-85, pp. 1135-1138.

R. Trautman et al., "Interactive Simultaneous Remote Searching: Evolution of Conference Call Searching to a Reliable Procedure", *Online*, 9-83, pp. 90-97.

AT&T, *Concurrent Context Switch*, 4-85.

Primary Examiner—Gareth D. Shaw
Assistant Examiner—Gopal C. Ray
Attorney, Agent, or Firm—David Volejnicek

[57] ABSTRACT

An arrangement for data conferencing either multiple computers (FIG. 1), or multiple terminals with a computer (FIG. 4), includes software (21;511) for communicating keystrokes from conference participants to an application program (22;550) that is the object of the conference, and for communicating display signals from the application program to the participants. In one embodiment (FIG. 1), a first program (23) executing on a first computer (PC 2) transmits first computer-generated keystrokes to a second computer (PC 1), and displays on the first computer images received from the second computer, while a second program (21) co-resident with the application program (22) on the second computer enters received first computer keystrokes into the second computer, and sends second computer-generated images for display to the first computer. In a second embodiment (FIG. 4), a program (511) executing on a UNIX® system-based computer (504) receives keystrokes from connected terminals (501-503) and sends them to the application program (550), and receives images from the application program and transmits them to the terminals.

15 Claims, 6 Drawing Sheets

DATA CONFERENCING ARRANGEMENT FOR STATIONS HAVING KEYBOARDS AND DISPLAYS, USING A KEYBOARD BUFFER AND A SCREEN BUFFER

TECHNICAL FIELD

This invention relates generally to arrangements for data conferencing between a plurality of data stations.

BACKGROUND OF THE INVENTION

Existing arrangements for data conferencing between a plurality of data stations, such as computers or terminals, use complex centralized conference circuits to interconnect the data stations. Such circuits become especially complex when adapted to interconnect stations of different types and operating at different transmission rates. It is a problem in the art that such data conference arrangements are complex, expensive, functionally dependent upon the inter-station communication medium and hence typically incompatible with any but one type of medium, and unable to make use of the often-large base of application programs available on the interconnected stations.

SUMMARY OF THE INVENTION

The invention is directed to solving these and other problems of the prior art. Generally according to the invention, an arrangement for data conferencing a plurality of stations includes a control arrangement for communicating keyboard keystrokes from conference participants to the object of the conference, such as an application program, and communicates display signals from the object to the participants.

According to one aspect of the invention, there is provided an arrangement for data conferencing a first and a second station, each one of which is equipped with a keyboard and a display. The conferencing arrangement includes a first control arrangement that is resident on the first station, that transmits keystroke signals generated at the first station's keyboard to the second station, and that displays on the second station's display an image represented by display signals which it receives from the second station. The conferencing arrangement also includes a second control arrangement that is resident on the second station, that enters keystroke signals which it receives from the first control arrangement into the second station as keystroke signals that are received from the second station's keyboard, and that transmits display signals representing an image sent by the second station to its display to the first control arrangement. Input from the keyboards of both stations is thus input to the second station while display output of the second station is displayed on the displays of both stations.

Illustratively, the first and the second station comprise a first and a second computer, respectively, and the first and the second control arrangement comprise a first and a second control program, respectively, each executing on the respective computer. The object of the conference, which is the destination of the keyboard input and the origin of the display output, illustratively comprises an application program executing on the second computer. The second control arrangement illustratively further comprises a control arrangement for effecting execution of both the application program and the second control program on the second computer in a time-shared manner.

According to a second aspect of the invention, there is provided an arrangement for data conferencing a plurality of first stations with a second station, with each one of the first stations having a keyboard and a display. The conferencing arrangement includes a control arrangement that is interposed between the first stations and the second station. The control arrangement receives keystroke signals generated at the keyboards of the first stations and transmits them to the second station. The control arrangement also receives signals representing an image that are generated by the second station and transmits display signals representing the image to the first stations to display the image on the displays of the first stations. Input from keyboards of all of the first stations is thus input to the second station, while display output of the second station is broadcast for display to all of the first stations.

Illustratively, the second station comprises a computer, whereas the first stations comprise computer terminals. The control arrangement illustratively comprises a control program executing either on the second station's computer, or on a second computer interposed between the second station's computer and the terminals. The object of the conference, which is again the destination of the keyboard output and the origin of the display output, illustratively comprises an application program executing on the second station's computer. The control arrangement illustratively further comprises a second control program for enabling the first-mentioned control program to receive from, and transmit to, the first stations. Illustratively, in the case of the computer executing the first-mentioned control program comprising an operating system including a shell program an instance of which executes for each first station to receive keystroke signals from, and to transmit display signals to, that first station, an instance of the second control program executes for each but one first station and causes that station's shell instance to suspend execution, in order to enable the first program instead of the shell to receive from and transmit to the first stations.

The data conferencing arrangement characterized above is generally simple and inexpensive, regardless of the types of stations and inter-station communication media used. It is independent of the type of inter-station medium used, and hence may be used with various types of media. And it does not require that any modifications be made to existing application programs, and hence is able to make use, as conference objects, of the often-large base of existing and available application programs.

These and other features and advantages of the present invention will become more apparent in the following discussion of illustrative embodiments of the invention taken together with the drawing.

DETAILED DESCRIPTION

Figure 1:
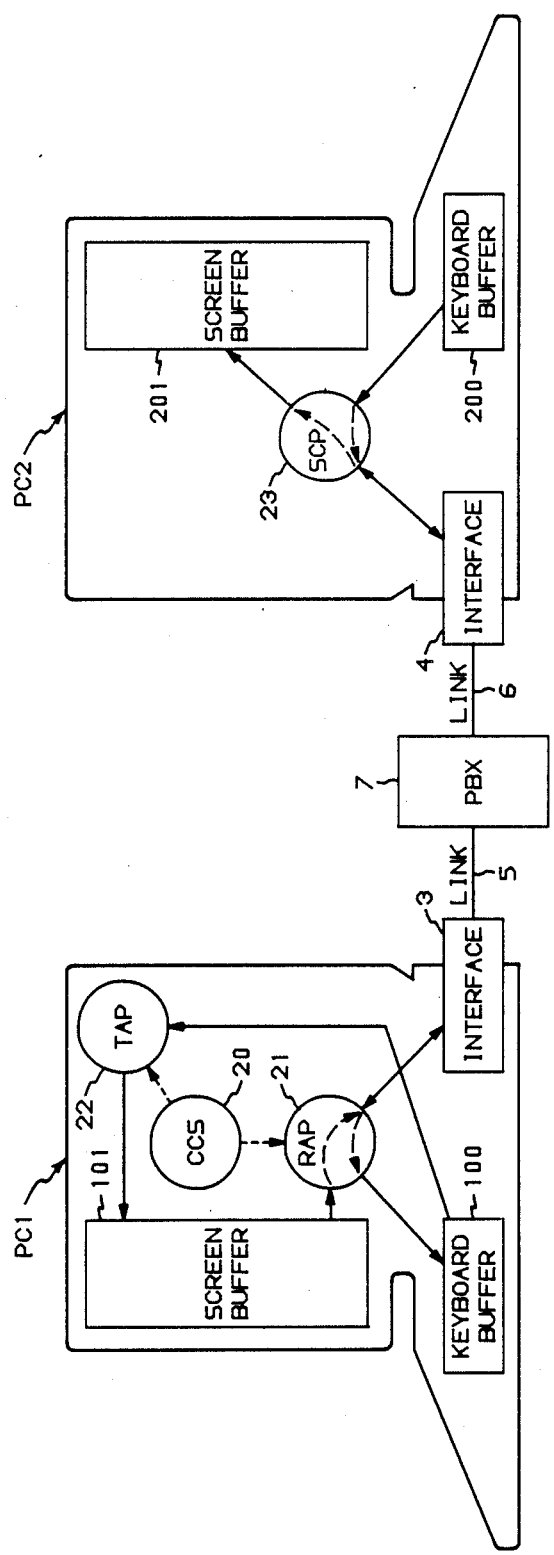
FIG. 1 is a block diagram of a computer system including a first illustrative embodiment of the invention.

FIG. 1 shows an illustrative computer system, comprising a pair of personal computers (PCs) 1 and 2 interconnected for communication through a private branch exchange (PBX) 7. Illustratively, PCs 1 and 2 are each an AT&T PC 6300 personal computer operating under the control of the MS-DOS operating system, and PBX 7 is an AT&T System 85 PBX. PCs 1 and 2 are connected to PBX 7 by communication links 5 and 6, respectively, which are, for example, conventional telephone lines. PCs 1 and 2 are coupled to links 5 and 6, respectively, by interfaces 3 and 4, respectively, which interface PCs 1 and 2 to the communication protocol used by PBX 7 on the links. Any number of interfaces are suitable for this purpose. For example, each interface 3 or 4 comprises an AT&T PC/PBX board whose software is modified to permit direct communication therewith by a program executing on the attached PC. Alternatively, each interface 3 or 4 comprises a modem connected between a serial port of the PC and the link. This latter arrangement is assumed to exist in the illustrative embodiment described below.

A program 22 which users of PCs 1 and 2 wish to conference is located on one of the PCs, shown illustratively as PC 1. Program 22 may be any program, for example, an application program such as a spread sheet or an editor. The PC on which program 22 resides is referred to as the application PC.

Program 22 is co-resident on application PC 1 with two other pieces of software. One is a program 20 that enables application PC 1 to function as a time-sharing computer system. Program 20 is illustratively the AT&T Concurrent Context Switch (CCS) program. The other program 21 is a primary conferencing program, described further below. Program 21 is conventionally loaded into application PC 1 as the Resident Application Program (RAP) of CCS program 20. Program 22 is in turn conventionally loaded into application PC 1 as the Transient Application Program (TAP) of CCS program 20. CCS program 20 allows both RAP program 21 and TAP program 22 to run on PC 1 concurrently, i.e., on a time-shared basis.

The only program of interest for purposes of this application which is loaded into PC 2 is a Secondary Conferencing Program (SCP) 23, described further below. The PC on which program 23 resides is referred to as the conference PC.

Each PC 1 and 2 has a conventional keyboard buffer 100 and 200, respectively, for storing input to the PC that has been keyed-in on the PC's keyboard. Each PC 1 and 2 also has a conventional screen buffer 101 and 201, respectively, for storing output generated by the PC for display on the PC's screen. The function of primary conferencing program 21 is to receive keyboard input from PC 2 and load the input into keyboard buffer 100 as if it were input from the keyboard of PC 1, and to send display output changes entered into screen buffer 101 to PC 2. The function of secondary conferencing program 23 is to send keyboard input from keyboard buffer 200 to PC 1, and to receive display output changes from PC 1 and load them into screen buffer 201 as if they were display output generated by PC 2. Hence, keyboard input on both PCs 1 and 2 is entered as keyboard input of PC 1 to TAP 22, while display output of TAP 22 generated in PC 1 is displayed on the screens of both PCs 1 and 2. Thus, a conference by users of both PCs 1 and 2 with TAP 22 is established in real-time.

To use the real-time data conferencing feature, a user of application PC 1 runs CCS program 20 and strikes the CCS "hot" key. Illustratively, on the PC 6300, the CCS "hot" key corresponds to keying "ALT-SHIFT-SHIFT". Striking the "hot" key causes CCS program 20 to invoke RAP program 21, the primary conferencing program.

Primary conferencing program 21 is a communications package that calls conference PC 2, performs initial handshaking, and handles the conferencing requirements for application PC 1.

In order to accept a conference call from application PC 1, conference PC 2 must be running secondary conference program 23. Illustratively, a communication, such as a person-to-person call, is required between the users of PCs 1 and 2 so that the user of PC 2 knows to start program 23 running.

Figure 2:
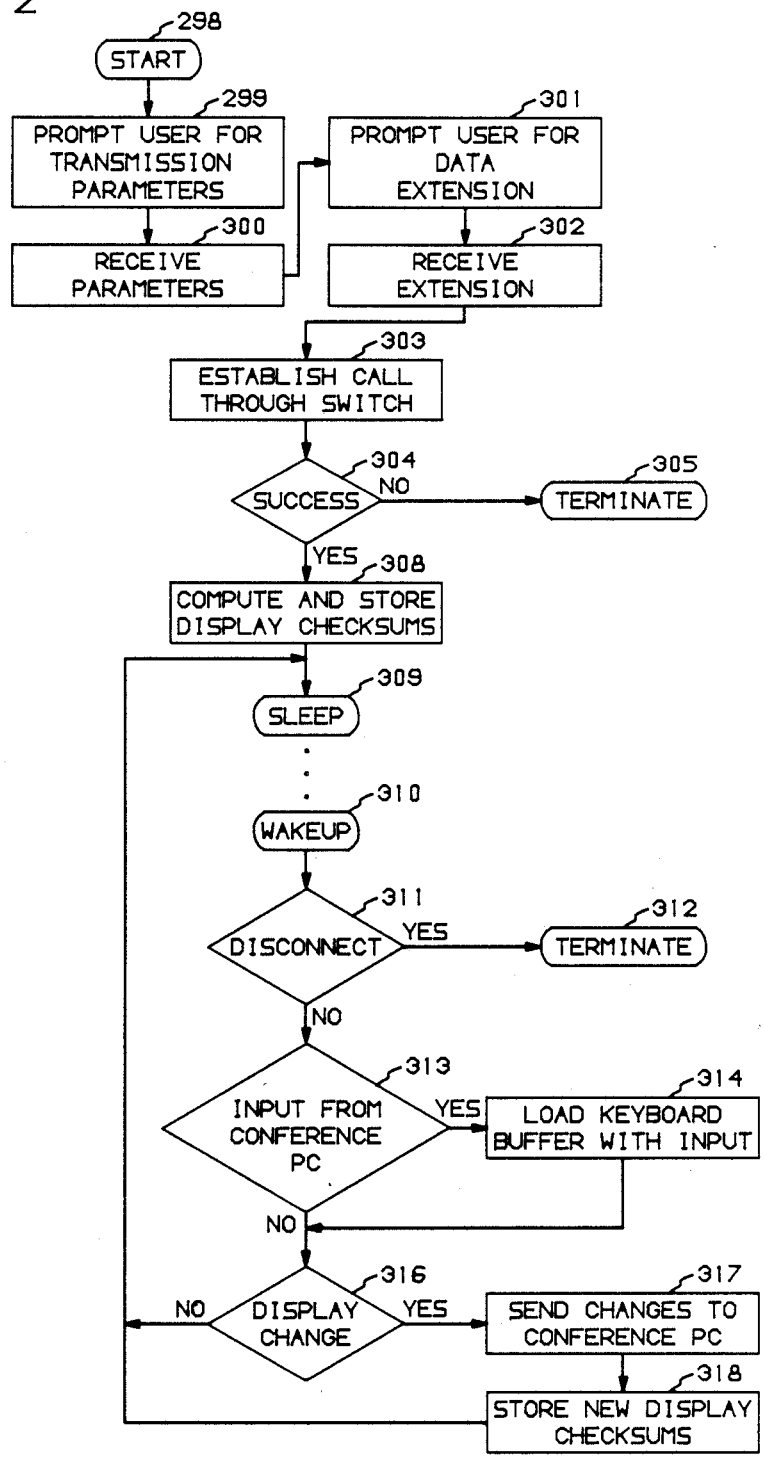
FIG. 2 is a flow diagram of the RAP program of FIG. 1.

FIG. 2 illustrates the operational steps of primary conferencing program 21. Assuming that interfaces 3 and 4 each comprise a modem, when primary conferencing program 21 is invoked, at step 298, it prompts the user of PC 1 via screen buffer 101 for the parameters according to which transmissions will proceed, at step 299. These parameters are conventional, and include the type of transmission stop and start characters to be used, the baud rate of transmission, the type of parity to be used, the number of stop bits, and the number of bits per character. When the user keys-in the parameters, program 21 receives that information via keyboard buffer 100, at step 300. (If interfaces 3 and 4 each comprise a PC/PBX board, steps 299 and 300 are skipped.) Program 21 then prompts the user of PC 1, at step 301, for the identification number of PC 2—illustratively the data telephone extension number of PC 2 within the system of FIG. 1. When the user keys-in the extension, program 21 receives that information via keyboard buffer 100, at step 302, and in response establishes a call to PC 2, at step 303. Program 21 interacts with interface 3 in a conventional manner to establish a call to switch 7 and to provide switch 7 with the extension of PC 2. Switch 7 then sets up the call to PC 2 and connects PC 1 to PC 2.

If program 21 determines from input received from interface 3 that establishment of the call is unsuccessful, at step 304, program 21 terminates, at step 305. Illustratively, call establishment may be unsuccessful because transmission parameters used by interface 3 are not the same as the transmission parameters used by interface 4. (But assuming that interfaces 3 and 4 each comprise a PC/PBX board, if call establishment is successful, program 21 next sets up transmission between PC 1 and PC 2 by causing interface 3 to communicate with interface 4 via the established call and negotiate, in a conventional manner, the transmission parameters, described above in conjunction with steps 299 and 300, that will be followed during subsequent data exchanges. Program 21 then proceeds to step 308.)

Assuming that interfaces 3 and 4 each comprise a modem, if call establishment is successful at step 304, program 21 computes and stores, at step 308, a line-by-line checksum on the display of screen of PC 1 as represented by contents of screen buffer 101, for later use in determining whether any changes have been made to the screen's display. Program 21 then goes to sleep, at step 309, in a conventional manner.

When program 21 is sleeping, CCS program 20 runs TAP program 22, and the user of PC 1 may interact with program 22 via the screen and keyboard of PC 1, in a conventional manner. As part of its execution, program 22 receives as input the contents of keyboard buffer 100 and generates display data that are loaded into screen buffer 101.

CCS program 20 automatically alternates between running TAP program 22 and RAP program 21, devoting to TAP program 22 a certain percentage of execution time of PC 1. The percentage is determined by a CCS program 20 initialization parameter, and typically is set at from 50% to 70% of execution time. After TAP program 22 has been executing for a while, CCS program 20 causes execution of TAP program 22 to become suspended and wakes up RAP program 21 to resume its execution.

Upon being awakened, at step 310, primary conferencing program 21 checks whether a "disconnect" command has been received, at step 311. Program 21 performs the check by examining the contents of keyboard buffer 100 to determine whether the user of PC 1 has keyed in a disconnect command, and by examining input received from interface 3 to determine whether a disconnect command has been received from PC 2. If a disconnect command has been given, program 21 terminates, at step 312.

If a disconnect command has not been given, as determined at step 311, program 21 checks input received from interface 3 to determine if any data has been received from conference PC 2, at step 313. If interface 3 has received any data, program 21 retrieves the data from interface 3 and loads the retrieved data into keyboard buffer 100, at step 314.

If no data has been received from PC 2 as determined at step 313, or following step 314, program 21 checks, at step 316, whether the screen display of PC 1 has changed. Program 21 makes the check by again computing line-by-line checksums on the display of the screen of PC 1, as at step 308, and then comparing the newly-computed checksums with those computed previously (e.g., at step 308) to determine if they are different.

If there has been a change in the display, program 21 causes interface 3 to send information defining the changes to conference PC 2, at step 317. Illustratively, this information comprises the addresses of the changed display lines and the values of the pixels of those lines. At step 318, program 21 stores the newly-computed checksums in place of those that were stored previously.

If there has not been a change in the display as determined at step 316, or following step 318, program 21 returns to sleep, at step 309, thereby giving TAP program 22 a chance to execute again.

Figure 3:
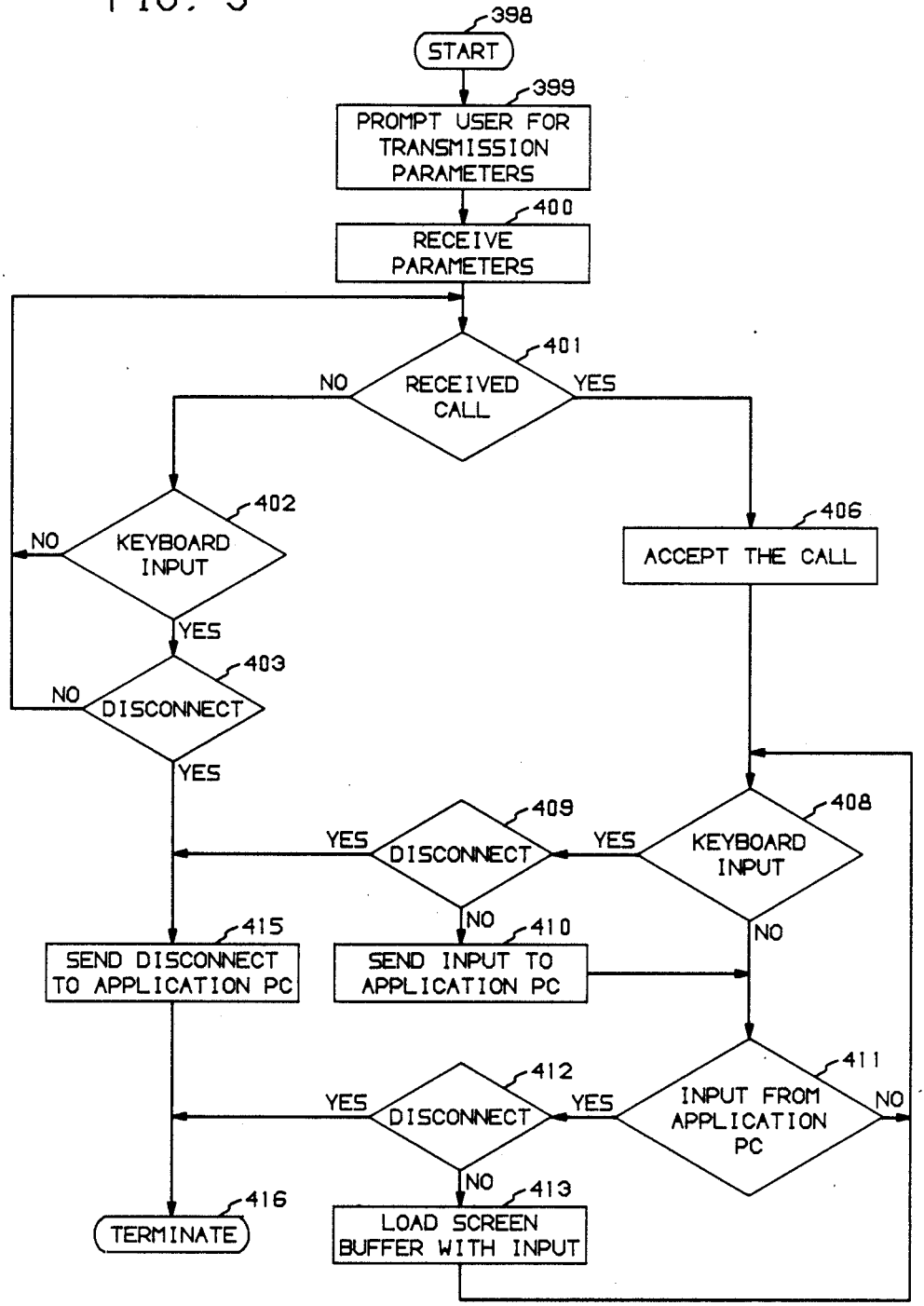
FIG. 3 is a flow diagram of the SCP program of FIG. 1.

Turning now to FIG. 3, it shows the operational steps of secondary conferencing program 23. Program 23 is responsible for accepting a data call from application PC 1, initial handshaking, and handling of the conferencing requirements for conference PC 2. Those requirements involve sending keystrokes made on PC 2 to PC 1, and displaying screen display information received from PC 1 on PC 2.

Assuming that interfaces 3 and 4 each comprise a modem, when secondary conferencing program 23 is started, at step 398, it prompts the user of PC 2 via screen buffer 101 for the parameters according to which transmission will proceed, at step 399. When the user keys-in the parameters, program 23 receives that information via keyboard buffer 200, at step 400. (If interfaces 3 and 4 each comprise a PC/PBX board, steps 399 and 400 are skipped.) Program 23 then checks input from interface 4, at step 401, to determine if a call has been received from application PC 1. If not, program 23 checks keyboard buffer 200, at step 402, to determine if any input has been keyed-in by the user of PC 2. If not, program 23 merely returns to step 401. If input has been keyed-in by the user of PC 2, program 23 checks the input, at step 403, to determine if it is a disconnect command. If not, program 23 merely returns to step 401; if so, program 23 causes interface 4 to send the command to application PC 1, at step 415, and then terminates, at step 416.

Returning to step 401, if program 23 determines that a call has been received from application PC 1, it undertakes activities to accept the call, at step 406. These activities include reading the communications port status for modems, or validating the return code for a PC/PBX connection. (If interfaces 3 and 4 each comprise a PC/PBX board, program 23 then sets up the transmission between PC 1 and PC 2 by causing interface 4 to communicate with interface 3 via the established call and negotiate, in a conventional manner, the transmission parameters that will be followed in subsequent exchanges of data. Program 23 then proceeds to step 408.)

Assuming that interfaces 3 and 4 each comprise a modem, following call acceptance at step 406, program 23 checks keyboard buffer 200 for input, at step 408. If there is input, program 23 examines the input to determine whether it is a disconnect command, at step 409. If so, program 23 proceeds to steps 415 and 416 to send the command to PC 1 and to terminate. If the input is not a disconnect command, program 23 causes interface 4 to send the contents of keyboard buffer 200 to application PC 1, at step 410.

Following step 410, or if program 23 determines at step 408 that there is no keyboard input, program 23 examines input received from interface 4 to determine if any input has been received from application PC 1, at step 411. If not, program 23 merely loops back to step 408 to check again for keyboard input; if so, program 23 examines the input to determine if it is a disconnect command, at step 412. If a disconnect command has been received from PC 1, program 23 proceeds to step 416 and terminates. If input received from PC 1 is not a disconnect command, it is screen display update information, and program 23 loads that information into screen buffer 201, at step 413, to cause the display of PC 2 to become updated. Program 23 then loops back to step 408.

Figure 4:
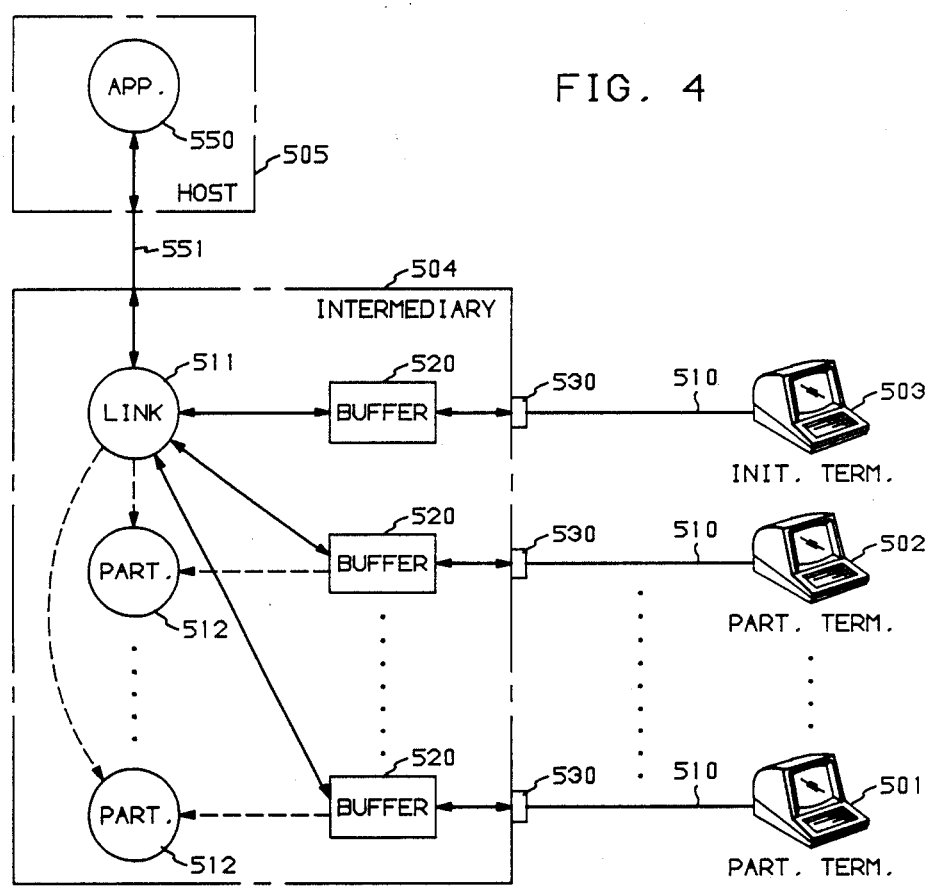
FIG. 4 is a block diagram of a computer system including a second illustrative embodiment of the invention.

FIG. 4 shows a second illustrative computer system comprising a plurality of terminals 501-503, an intermediary computer 504, and a host computer 505. Terminals 501-503 are conventional terminals. For ease of description, terminals 501-503 are considered to have compatible input and output formats. Terminals 501-503 are each connected to a port 530 of intermediary computer 504 in a conventional manner, for example, via a standard ASCII interface 510.

Intermediary computer 504 simulates a switch, channeling output from terminals 501-503 to host computer 505, and broadcasting output from host computer 505 to terminals 501-503. Illustratively, intermediary computer 504 is an AT&T 3B2 computer operating under control of the UNIX ® operating system.

Host computer 505 is a conventional computer, typically a minicomputer or a mainframe. Illustratively, computer 505 is a DEC VAX minicomputer operating under control of the UNIX operating system. Computers 504 and 505 are interconnected by a conventional communication link 551. Computers 504 and 505 are known to each other through their internal systems files, as is conventional.

Programs with which users of terminals 501-503 wish to conference, such as an application program 550 taken to be illustrative thereof, are located in computer 505—hence the name "host" computer. Terminals 501-503 are provided access to program 550 by a link program 511 in cooperation with participant program 512. Link program 511 and participant program 512 are located in computer 504—hence the name "intermediary" computer.

As is conventional, when a terminal logs into computer 504, the operating system of computer 504 assigns a buffer 520 to port 530 at which the terminal is connected to computer 504. Each port 530 has an address which is also used by the operating system to identify buffer 520 associated with that port 530. Terminals 501-503 and the operating system then communicate with each other through buffers 520: the operating system's shell, an instance of which is assigned to each logged-in terminal 501-503, reads terminal output from the associated buffer 520 and writes terminal input to that buffer 520.

A conference has a plurality of participants, but only one of the participants is the conference initiator. A voice call among the users of terminals 501-503—the assumed conference participants—that either precedes, or is contemporaneous with, the data conference is assumed for the purpose of deciding who among conference participants 501-503 will be the initiator.

Assume that terminal 501 is selected to be the conference initiator. Each of the non-initiator conference participants 502-503 sends a "part" command to intermediary computer 504. The commands are retrieved from the terminals' buffers 520 each by the associated instance of the shell. Each instance of the shell responds to the command by invoking participant program 512 and suspends itself by executing a conventional UNIX system "WAIT", waiting for a UNIX system SIGCLD signal. Hence, a number of instances of participant program 512 begin to execute in computer 504, one instance for each non-initiator participant terminal 502-503.

Figure 5:
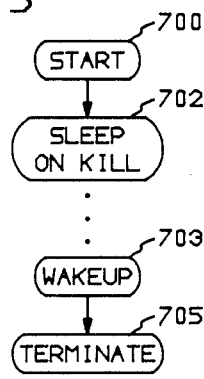
FIG. 5 is a flow diagram of a PART. program of FIG. 5.

The operational steps of participant program 512 are shown in FIG. 5. During the conference, it is desired that link program 511, and not the shell, communicate with participant terminals 501-503. For this purpose, it is the function of each instance of participant program 512 merely to keep the corresponding instance of the shell suspended in the "WAIT" state. Upon being invoked, at step 700, the invoked instance of participant program 512 merely puts itself to sleep, at step 702, in a conventional manner, while awaiting receipt of a KILL signal from link program 511.

The KILL signal indicates that the corresponding terminal is ceasing participation in the conference. Receipt of the KILL signal causes the recipient instance of participant program 512 to wake up, in a conventional manner, at step 703. The instance of participant program 512 then terminates at step 705, thereby causing a SIGCLD signal to be sent to the corresponding instance of the shell in a conventional manner. Receipt of the SIGCLD signals unblocks the shell from the "WAIT" state and it resumes execution.

Turning now to initiator terminal 501, it sends a "conf" command to intermediary computer 504 to initiate the conference. The command is retrieved from buffer 520 by the associated instance of the shell, and the shell responds to the command by invoking link program 511 and suspending itself, i.e., executing a conventional UNIX system "WAIT".

Figure 6:
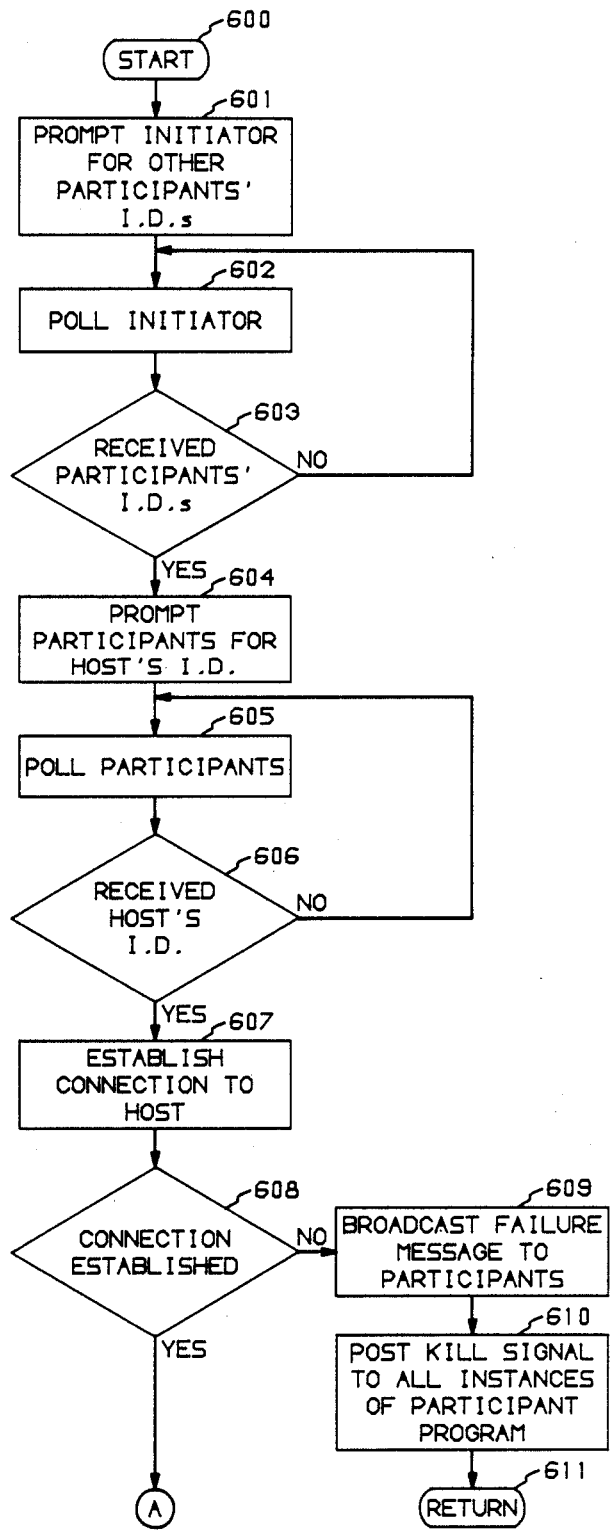
FIGS. 6-7 are a flow diagram of the LINK program of FIG. 5.
Figure 7:
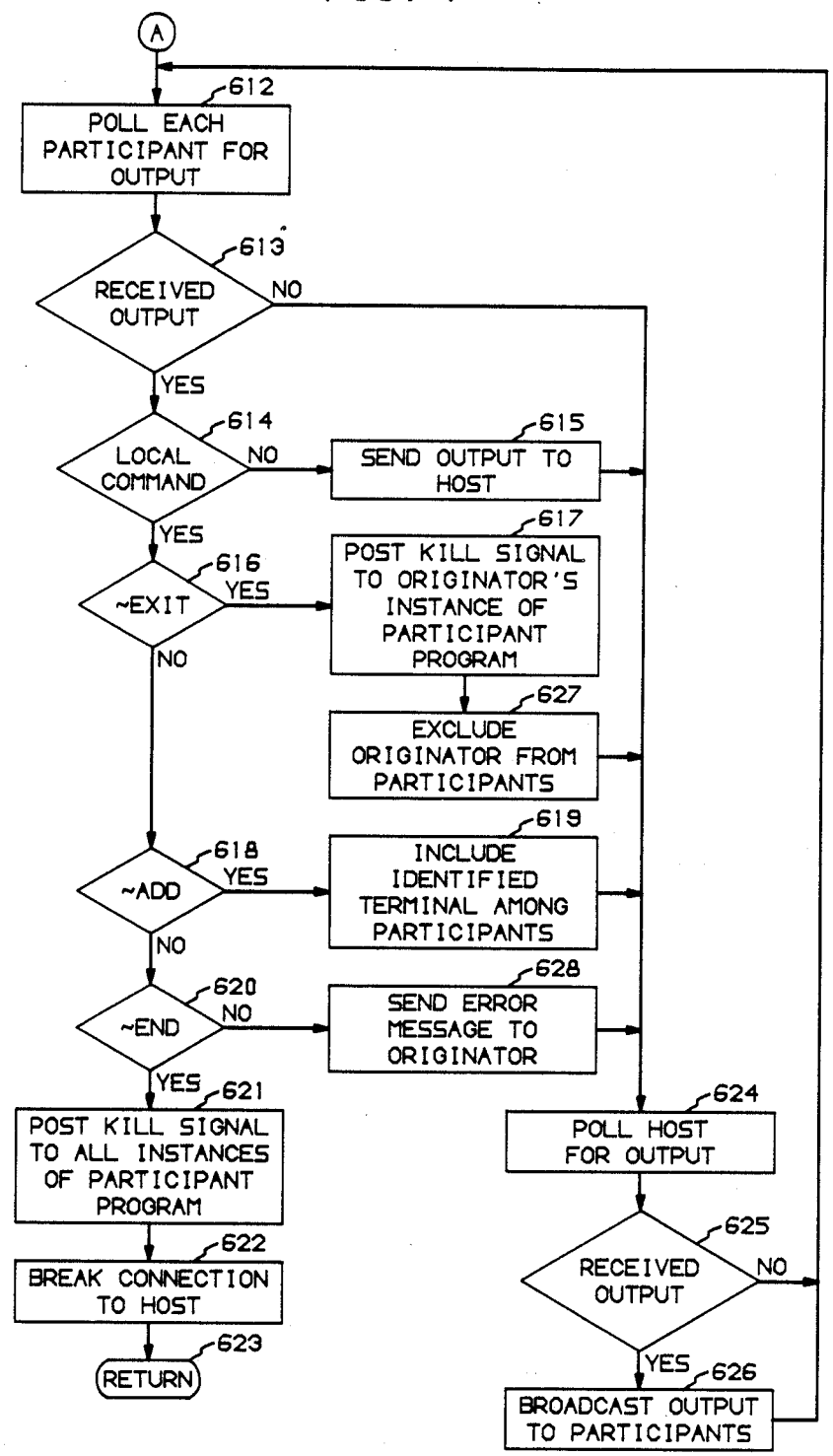

The operational steps of link program 511 are shown in FIGS. 6-7. Upon being invoked, at step 600, link program 511 prompts initiator terminal 501, at step 601, for information identifying the other participant terminals 502-503. This information is, for example, the login ID of the terminal, or the device number of port 530 at which the terminal is connected to computer 504. Program 511 accomplishes the prompt by loading a prompt display message into buffer 520 of initiator terminal 501. Program 511 then loops between steps 602 and 603, polling the initiator's buffer 520, at step 602, and awaiting receipt of the identifying information, at step 603.

Upon receipt of the sought-after information, at step 603, program 511 prompts all participant terminals 501-503 for information identifying host computer 505, at step 604. This information is, for example, a UNIX system machine name of host 505. Program 511 prompts for the information by placing a prompt display message in buffers 520 of terminals 501-503. Program 511 then polls buffers 520 of terminals 501-503, at step 605, looking for a response, at step 606.

When a user of one of the terminals 501-503 keys in the host-identifying information, program 511 receives it, at step 606, via that terminal's buffer 520. Upon receipt of the identifying information, program 511 causes a connection to be established to host computer 505, at step 607. Illustratively, program 511 does so by invoking the UUCP program of the UNIX operating system of computer 504, and passing to it the host computer's machine name or dial-up number as a parameter. Program 511 then checks whether connection establishment was successful, at step 608. If not, program 511 sends a display message to terminals 501-503 via their buffers 520 to inform them of the failure, at step 609, and through the UNIX operating system posts a KILL signal to each instance of participant program 512, at step 610. Program 511 then terminates, by returning to the shell program, at step 611. The shell program is thereby unblocked and resumes communicating with terminal 501.

If establishment of a connection to host computer 505 is found at step 608 to have been successful, program 511 polls each participant terminal's buffer 520 for terminal output, at step 613. If output is received from a terminal, as determined at step 613, program 511 checks, at step 614, whether the output is a local command, that is, a command intended for intermediary computer 504. Illustratively, a local command is one preceded by the symbol "~". If the output is not a local command, program 511 treats the output as input for host computer 505, and causes it to be sent to host computer 505, at step 615. Illustratively, program 511 accomplishes the transfer by invoking the UUCP program and passing the output to it as an argument. Host computer 505 then conveys the output to program 550 in a conventional manner.

If the output is found at step 614 to be a local command, program 511 processes it, at steps 616–623. Illustratively, program 511 recognizes three local commands an "~exit" command, at step 616, an "~add" command, at step 618, and an "~end" command, at step 620. If the local command is an "~exit" command, program 511 terminates participation in the conference of the terminal that originated the command, by sending a KILL signal to that terminal's associated instance of participant program 512, at step 617. If the local command is an "~add" command, program 511 includes as a participant in the conference a terminal whose ID accompanies the command as a parameter, at step 619, by including that terminal's buffer 520 among the buffers 520 with which program 511 is communicating. If the local command is an "~end" command, program 511 terminates the conference by sending a KILL signal to all non-initiator participant terminals' 502–503 instances of participant program 512, at step 621. Program 511 then causes the connection to host computer 505 to be broken, at step 622, by invoking the UUCP program with appropriate parameters. Finally, program 511 terminates by returning to the shell program, at step 623.

If no output is received from a terminal 501-503 during the poll cycle of step 612, as determined at step 613, or following steps 615, 617, or 619, program 511 polls host computer 505 for output, at step 624. Program 511 does so by again using the services of the UUCP program. Typically, such host output represents information being sent by program 550 to conference participants 501–503. If output is received from host computer 505, as determined at terminals 501–503, at step 626, by loading a copy thereof into each participant terminal's buffer 520. If no output is received from host computer 505 at step 625, or following step 626, program 511 loops back to step 612 to poll participant terminals 501–503 for output.

Of course, it should be understood that various changes and modifications may be made to the above-described illustrative embodiments of the invention. For example, compression algorithms may be applied to the display output to reduce the amount of information that must be transferred. Also, the display transmissions may be accomplished by hardware instead of software. Also, in the first illustrative embodiment, multiple conference PCs may be used, by using a multiple serial port board or a LAN connection. Or, in the second embodiment, the UUCP link may be replaced with a program that uses standard UNIX system pipes, thereby eliminating the intermediary computer.

Such changes and modifications may be made without departing from the spirit and the scope of the invention. It is therefore intended that such changes and modifications be covered by the following claims.

What is claimed is:

1. An arrangement for interactively coupling a first and a second station each having a keyboard and a display, the second station further having a screen buffer for storing display signals that represent images dis by the display of the second station and a keyboard buffer for storing keystroke signals generated by the keyboard of the second station, which stations are interconnected by a signal transmission path, the arrangement comprising:

first control means resident at the first station for transmitting keystroke signals generated at the first station's keyboard to the second station, and responsive to display signals received from the second station for displaying an image represented by the received display signals on the first station's display; and second control means resident at the second station responsive to keystroke signals received from the first control means for storing the received keystroke signals in the keyboard buffer of the second station as keystroke signals received from the second station's keyboard, and responsive to the second station storing in the screen buffer of the second station signals representing an image for display by the second station's display, f transmitting display signals representing the image to the first control means 2. The arrangement of claim 1 further including:

an application program resident at the second station; and the second control means comprising means for storing received keystroke signals in the keyboard buffer of the second station for provision to the application program, and responsive to signals representing an image output by the application program for storage in the screen buffer of second station for transmitting display signals representing the image to the first control means.

3. The arrangement of claim 2 wherein the second control means include a control program; and the arrangement further comprising third control means resident at the second station for effecting execution of both the application program and the control program in a time-shared manner.

4. The arrangement of claim 3 wherein the first and second stations comprise computers for executing programs; and wherein the first control means include a terminal emulation program executing on the computer of the first station.

5. An apparatus for data conferencing a first and a second computer each having a keyboard and a display, the first computer further having a screen buffer for storing display signals that represent images displayed by the display of the first computer and a keyboard buffer for storing keystroke signals generated by the keyboard of the first computer, which computers are interconnected by a signal transmission path, comprising:

first control means resident at the first computer for coordinating the data conferencing operation of both the first and the second computers;

second control means resident at the second computer for transmitting all keystroke signals generated at the second computer keyboard to the first control means, and responsive to display signals recevied from the first control means for displaying the received display signals on the second computer display;

means in said first control means responsive to keystroke signals received from the second control means for entering those received keystroke signals into the keyboard buffer of the first computer as keystroke signals received from the first computer keyboard; and means in the first control means responsive to the first computer storing in the screen buffer of the second computer signals representing a new image for display on the first computer display, for transmitting the signals representing the new image to the second control means.

6. An arrangement for interactively coupling a plurality of first stations with a second station, the second station and each first station having a keyboard and a display and the second station further having a screen buff for storing display signals that represent images displayed by the display of the second station and a keyboard buffer for storing keystroke signals generated the keyboard of the second station, which first stations are connected to the second station by a transmission path, the arrangement comprising:

control means interfacing the plurality of first stations with the second station, for receiving keystroke signals generated at the keyboards of the first stations and storing the received keystroke signals in the keyboard buffer of the second station as keystroke signals received from the second station's keyboard, and for receiving signals representing an image generated by the second station for display on the second station's display and stored in the screen buffer of the second station, and transmitting display signals representing the image to the first stations to display the image on the displays of the first stations.

7. The arrangement of claim 6 wherein
the control means include means for receiving display signals generated by the second station and transmitting the received display signals to the displays of the first stations.

8. The arrangement of claim 6 further including:
an application program resident at the second station; and wherein
the control means comprise means for receiving keystroke signals from the first stations and storing the received keystroke signals in the keyboard buffer of the second station for provision to the application program, and for receiving display signals output by the application program for storage in the screen buffer of the second station and transmitting the received display signals to the first stations.

9. The arrangement of claim 6 further comprising:
a third station interposed between, and connected by a transmission path to, the plurality of first stations and the second station; and wherein
the control means are resident at the third station.

10. The arrangement of claim 8 wherein
the third station includes an operating system including a shell program an instance of which executes for each first station to receive keystroke signals from, and to transmit display signals to, the first station and wherein
the control means include a program an instance of which executes for each first station, each program instance for suspending execution of a shell instance, to enable the second station to receive from, and transmit to, the plurality of first stations.

11. The arrangement of claim 1 for the first station and a plurality of the first stations, wherein
the first control means comprise
a plurality of third control means one resident at each first station, each third control means for transmitting keystroke signals generated at the keyboard of the resident first station to the second station, and responsive display signals received from the second station for displaying an image represented by the received display signals on the display of the resident first station; and wherein
the second control means comprise means responsive to keystroke signals received from any of the third control means for storing the receive keystroke signals in the keyboard buffer of the second station as keystroke signals received from the second station's keyboard, and responsive to the second station storing in the screen buffer of the second station signals representing an image for display by the second station's display, for transmitting display signals representing the image to all third control means.

12. The arrangement of claim 1 wherein
the second control means comprise
means responsive to the second station storing in the screen buffer of the second station display signals representing an image for display by the second station's display, for transmitting the stored display signals to the first control means.

13. An arrangement for interactively coupling a first station having a keyboard, a keyboard buffer for storing keystroke signals generated by the keyboard, a display, and a screen buffer for storing display images displayed by the display, with a second station connected to the first station by a signal transmission path, the second station for transmitting on the path to the first station keystroke signals generate at the second station and for displaying at the second station an image represented by display signals received on the path from the first station the arrangement comprising:

means responsive to keystroke signals received from the second station for storing the received keystroke signals in the first station's keyboard buffer as keystroke signals received from the first station's keyboard, and responsive to the first station storing in the first station's screen buffer signals representing an image for display by the first station's display, for transmitting display signals representing the image to the second station.

14. The arrangement of claim 13 further including:
an application program executing in the first station; and
the storing and transmitting means comprising means for storing received keystroke signals in the keyboard buffer of the first station for provision to the application program, and responsive to signals representing an image out by the application program for storage in the screen buffer of the first station for transmitting display signals representing the image to the second station.

15. The arrangement of claim 13 wherein:
the storing and transmitting means include:
means for executing an application program; and
means for storing received keystroke signals in the keyboard buffer of the first station for provision to the application program, and responsive to signals representing an image output by the application program for storage in the screen buffer of the first station for transmitting display signals representing the image to the second station.

* * * * *